(12) United States Patent
Maeda et al.

(10) Patent No.: US 7,996,657 B2
(45) Date of Patent: Aug. 9, 2011

(54) RECONFIGURABLE COMPUTING CIRCUIT

(75) Inventors: Masaki Maeda, Osaka (JP); Takahiro Ichinomiya, Osaka (JP)

(73) Assignee: Panasonic Corporation, Osaka (JP)

( * ) Notice: Subject to any disclaimer, the term of this patent is extended or adjusted under 35 U.S.C. 154(b) by 695 days.

(21) Appl. No.: 12/105,551

(22) Filed: Apr. 18, 2008

(65) Prior Publication Data

US 2009/0327653 A1 Dec. 31, 2009

(30) Foreign Application Priority Data

Apr. 19, 2007 (JP) ................. 2007-110228

(51) Int. Cl.
*G06F 7/38* (2006.01)
*G06F 9/00* (2006.01)
(52) U.S. Cl. ........................ 712/220; 712/221
(58) Field of Classification Search ................ 712/1, 15, 712/16, 220, 221, 225
See application file for complete search history.

(56) References Cited

U.S. PATENT DOCUMENTS

| | | | | |
|---|---|---|---|---|
| 5,471,626 A * | 11/1995 | Carnevale et al. | ............ | 712/219 |
| 6,604,188 B1 * | 8/2003 | Coon et al. | ...................... | 712/24 |
| 7,245,690 B2 * | 7/2007 | Mutaguchi | ....................... | 377/64 |
| 7,287,189 B1 * | 10/2007 | Johnson et al. | ................. | 714/32 |
| 7,496,734 B1 * | 2/2009 | Richardson et al. | .......... | 712/217 |
| 7,685,403 B1 * | 3/2010 | Coon et al. | ....................... | 712/24 |
| 2005/0276369 A1 * | 12/2005 | Mutaguchi | ....................... | 377/64 |

FOREIGN PATENT DOCUMENTS

| EP | 569312 A2 * | 11/1993 |
|---|---|---|
| EP | 1150203 A2 * | 10/2001 |
| JP | 1-289269 | 11/1989 |

* cited by examiner

*Primary Examiner* — Aimee Li
(74) *Attorney, Agent, or Firm* — Wenderoth, Lind & Ponack L.L.P.

(57) ABSTRACT

A reconfigurable computing circuit for reducing the amount of dummy data to be stored in data registers, which is required when the wiring is shared by the configuration information bus and scan chain. When data is to be stored in data registers and configuration registers constituting the scan chain in reconfig computing block 2010, reg setting data selecting unit 3400 selects either a value stored in reg setting data storage unit 3000 or an initial value output from data reg data generating unit 4000, based on the information stored in reg type managing unit 1100 that indicates the types of registers and the connection order of the registers in the scan chain, and outputs the selected value in sequence to the scan chain under control of scan/reconfig control unit 1000. Each register in the scan chain then shifts data stored therein to the next register in the scan chain in sequence.

15 Claims, 19 Drawing Sheets

FIG.6

Reg type managing unit 1100

| Reg type | Reg number |
|---|---|
| 0  (data reg) | 4 |
| 1  (config reg) | 1 |
| 0  (data reg) | 1 |
| 1  (config reg) | 1 |
| 0  (data reg) | 1 |
| 1  (config reg) | 2 |
| 0  (data reg) | 1 |
| 1  (config reg) | 1 |
| 0  (data reg) | 1 |
| 1  (config reg) | 1 |
| 0  (data reg) | 1 |

FIG.10

Reg setting data storage unit 3000

| | |
|---|---|
| Address 0 | For config reg 2311 |
| Address 1 | For config reg 2312 |
| Address 2 | For config reg 2313 |
| Address 3 | For config reg 2301 |
| Address 4 | For config reg 2302 |
| Address 5 | For config reg 2303 |

FIG.11

Reg type managing unit 1100

| Reg type | Reg number |
|---|---|
| 0 (data reg) | 3 |
| 1 (config reg) | 3 |
| 0 (data reg) | 3 |
| 1 (config reg) | 3 |
| 0 (data reg) | 3 |

FIG.14

Reg type managing unit 1100

| Reg type | | Reg number |
|---|---|---|
| 0 | (data reg initial: 0) | 3 |
| 1 | (config reg) | 3 |
| 0 | (data reg initial: 0) | 3 |
| 1 | (config reg) | 3 |
| 2 | (data reg initial: 1) | 3 |

RECONFIGURABLE COMPUTING CIRCUIT

BACKGROUND OF THE INVENTION (1) Field of the Invention

The present invention relates to a dynamic reconfigurable computing circuit which can reconfigure the logic configuration dynamically, specifically to a technology of restricting the area of hardware resources required for the reconfiguring.

(2) Description of the Related Art

In recent years, what is called a dynamic reconfigurable computing circuit or a dynamic reconfiguration logic, of which FPGA (Field Programmable Gate Array) or PLG (Programmable Logic Device) is representative, has been developed eagerly. The dynamic reconfigurable computing circuit enables the logic configuration to be reconfigured by a program, making use of the flexibility of software and the speed of hardware.

The FPGA or PLG enables a program to change the connection between transistors, dynamically to some extent.

However, simple FPGAs or PLGs have a problem that they require a large number of hardware resources to perform the reconfiguring, and thus have a large circuit area.

Patent Document 1 identified below discloses one example of technology for solving the problem.

The reconfigurable computing circuit of Patent Document 1 includes a preparatory gate, a switch unit for switching the logic functions for the preparatory gate, a scan path, and a latch unit connected in series to the scan path.

Data is input to the latch unit via the scan path, and then the logic functions are switched by the switch unit in accordance with the data held by the latch unit.

This structure enables the wiring to be shared by the scan path test and by the transfer of the configuration information that is stored in the latch unit to switch the logic functions, thereby reducing the area of hardware.
Patent Document 1: Japanese Patent Application Publication No. H1-289269

However, with the above-described structure of Patent Document 1, to transfer the data to be stored in the latch unit, each register in the scan path needs to store the data.

This causes a problem that the larger the above-described reconfigurable computing circuit is in scale, the larger the area for storing the data that is to be stored in the data registers is, and accordingly the larger the area of the circuit is.

SUMMARY OF THE INVENTION

The object of the present invention is therefore to provide a reconfigurable computing circuit, a reconfigurable computing circuit mounting board, an information processing device and a reconfigurable computing method which can restrict the area of the circuit.

The above object is fulfilled by a reconfigurable computing circuit comprising: a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each register shifts to next connected register in the series, with input information being stored into a starting register of the series; a first storage unit storing one or more pieces of configuration information arranged in a predetermined order so as to be stored into the configuration registers; a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group; a generating unit operable to generate an initial value; and a control unit operable to read, one by one, the plurality of pieces of group information from the second storage unit, judge a register type from a read piece of group information, and when the judged register type is data register, output the initial value, in synchronization with the shift instruction, to the reconfigurable computing block as many times as the number of registers indicated by the read piece of group information, and when the judged register type is configuration register, read as many pieces of configuration information from the first storage unit one by one as the number of registers indicated by the read piece of group information, and output the read pieces of configuration information to the reconfigurable computing block one by one in synchronization with the shift instruction.

In the above-described structure of the reconfigurable computing circuit, the generating unit generates the initial value. This structure eliminates the need for storing initial values together with the configuration information so that these information are shifted in the series to be stored in the data registers and the configuration registers in the series, respectively.

Accordingly, even if the reconfigurable computing circuit becomes large in scale, there is no increase in the area for storing the initial values depending on the number of data registers. The structure of the present invention therefore restricts the increase in the area of hardware that is caused due to increase in the area for storing data.

In the above-stated reconfigurable computing circuit, at least a predetermined number of configuration registers or at least a predetermined number of data registers may be connected continuously in the series.

In the above-stated reconfigurable computing circuit, the predetermined number may be approximately 10% of a total number of registers.

With the above-described structures, it is possible to decrease the number of pieces of group information as the number of continuous registers of the same type increase, and thus it is possible to reduce the area of the circuit.

In the above-stated reconfigurable computing circuit, the register type in each piece of group information may indicate, by a different value, either a data register whose initial value is a first value or a data register whose initial value is a second value, and the control unit outputs the first value, as the initial value, to the reconfigurable computing block when the register type indicates the data register whose initial value is the first value, and outputs the second value, as the initial value, to the reconfigurable computing block when the register type indicates the data register whose initial value is the second value.

With the above-described structures, it is possible to store one of a plurality of initial values into each data register, and thus it is possible to configure the reconfigurable computing circuit in a flexible manner.

The above object is also fulfilled by a reconfigurable computing circuit comprising configuration registers, data registers, and reconfigurable computing units, the configuration registers and the data registers being connected in series, the computing units being connected respectively to the configuration registers, wherein each time a shift instruction is given, information in each register shifts to next connected register in the series, and input information is stored into a starting register of the series, and a ratio of (i) a number of registers of a same type having been connected continuously in the series to (ii) a total number of registers is a predetermined value or higher.

In the above-stated reconfigurable computing circuit, the predetermined number may be approximately 10% of a total number of registers.

With the above-described structures, when data is stored into a predetermined number of registers in the series starting with the starting register of the series, it is possible, for example, to stop the shift operation after the shift operation is performed a predetermined number of times, and thus it is possible to control the reconfiguration in a flexible manner.

In the above-stated reconfigurable computing circuit, each data register may include an computational input operable to obtain computation data from a source that is not connected to the series of registers, each configuration register includes a maintenance mechanism operable to restrict the own register from receiving information and maintain information currently stored in the own register, and when each data register obtains the computation data, the control unit activates the maintenance mechanism of each configuration register.

With the above-described structure where the computation data is stored into the data registers, it is possible to prevent the information in the configuration registers from being broken.

The above object is also fulfilled by a reconfigurable computing circuit mounting board comprising a first reconfigurable computing circuit and a second reconfigurable computing circuit, wherein each of the first reconfigurable computing circuit and the second reconfigurable computing circuit includes: a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each register shifts to next connected register in the series, with input information being stored into a starting register of the series; a first storage unit storing one or more pieces of configuration information arranged in a predetermined order so as to be stored into the configuration registers; a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group; a generating unit operable to generate an initial value; and a control unit operable to read, one by one, the plurality of pieces of group information from the second storage unit, judge a register type from a read piece of group information, and when the judged register type is data register, output the initial value, in synchronization with the shift instruction, to the reconfigurable computing block as many times as the number of registers indicated by the read piece of group information, and when the judged register type is configuration register, read as many pieces of configuration information from the first storage unit one by one as the number of registers indicated by the read piece of group information, and output the read pieces of configuration information to the reconfigurable computing block one by one in synchronization with the shift instruction, and an output of a last register in the series within the first reconfigurable computing circuit has been connected to an input of a starting register in the series within the second reconfigurable computing circuit.

With the above-described structure, it is possible to combine a plurality of reconfigurable computing circuits to create a large-scale computing circuit that can perform a plurality of computations, and it is possible to restrict the area of the circuit.

The above object is also fulfilled by an information processing device comprising a reconfigurable computing circuit, wherein the reconfigurable computing circuit includes: a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each register shifts to next connected register in the series, with input information being stored into a starting register of the series; a first storage unit storing one or more pieces of configuration information arranged in a predetermined order so as to be stored into the configuration registers; a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group; a generating unit operable to generate an initial value; and a control unit operable to read, one by one, the plurality of pieces of group information from the second storage unit, judge a register type from a read piece of group information, and when the judged register type is data register, output the initial value, in synchronization with the shift instruction, to the reconfigurable computing block as many times as the number of registers indicated by the read piece of group information, and when the judged register type is configuration register, read as many pieces of configuration information from the first storage unit one by one as the number of registers indicated by the read piece of group information, and output the read pieces of configuration information to the reconfigurable computing block one by one in synchronization with the shift instruction.

With the above-described structure, it is possible to combine a plurality of reconfigurable computing circuits to create a large-scale computing circuit that can perform a plurality of computations, and it is possible to create an information processing device containing the large-scale computing circuit, with the area of the circuit being restricted.

The above object is also fulfilled by a reconfigurable computing method for use in a reconfigurable computing circuit, wherein the reconfigurable computing circuit includes: a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each register shifts to next connected register in the series, with input information being stored into a starting register of the series; a first storage unit storing one or more pieces of configuration information arranged in a predetermined order so as to be stored into the configuration registers; and a second storage unit storing a plurality of pieces of group information that correspond oneto-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group, and the reconfigurable computing method comprises the steps of: generating an initial value; and reading, one by one, the plurality of pieces of group information from the second storage unit, judging a register type from a read piece of group information, and when the judged register type is data register, outputting the initial value, in synchronization with the shift instruction, to the reconfigurable computing block as many times as the number of registers indicated by the read piece of group information, and when the judged register type is configuration register, reading as many pieces of configuration information from the first storage unit one by one as the number of registers indicated by the read piece of group information, and outputting the read pieces of configuration information to the reconfigurable computing block one by one in synchronization with the shift instruction.

In the above-described structure of the reconfigurable computing circuit, the generating step generates the initial value. This structure eliminates the need for storing initial values together with the configuration information so that these information are shifted in the series to be stored in the data registers and the configuration registers in the series, respectively.

Accordingly, even if the reconfigurable computing circuit becomes large in scale, there is no increase in the area for storing the initial values depending on the number of data registers. The structure of the present invention therefore restricts the increase in the area of hardware that is caused due to increase in the area for storing data.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows values of the types and number of registers stored in the reg type managing unit 1100 in Embodiment 1;

FIG. 10 shows a list of data values of the configuration information of the reg setting data storage unit 3000 in Embodiments 2 and 3;

FIG. 11 shows values of the types and number of registers stored in the reg type managing unit 1100 in Embodiment 2;

FIG. 14 shows values of the types and number of registers stored in the reg type managing unit 1100 in Embodiment 3;

DESCRIPTION OF CHARACTERS 15 reconfigurable computing circuit mounting board
100, 110 dynamic reconfigurable computing circuit
1100 reg type managing unit
2000, 2010 reconfig computing block
2101-2113 reconfig computing units
2201-2223 data registers
2301-2313 config registers
2501-2503 computational inputs
2601-2603 computational outputs
2701, 2701-1, 2701-2, 2751 scan/config information inputs
2702, 2702-1, 2702-2, 2752 scan outputs
2703 scan/reconfig mode signal
3000 reg setting data storage unit
3400 reg setting data selecting unit
3500 scan/reconfig data selecting unit
4000 data reg data generating unit
5000 scan path input data generating circuit
6000 scan path output data generating circuit
7000 scan path output data comparing unit
8000 CLK generating unit
10000 mobile communication device
11000 display
12000 imaging unit
13000 audio output unit
14000 audio input unit
15000 command input unit
16000 antenna

DETAILED DESCRIPTION OF THE INVENTION

The following describes preferred embodiments of the present invention, with reference to the attached drawings.

1. Embodiment 1

1.1. Structure

Figure 1:
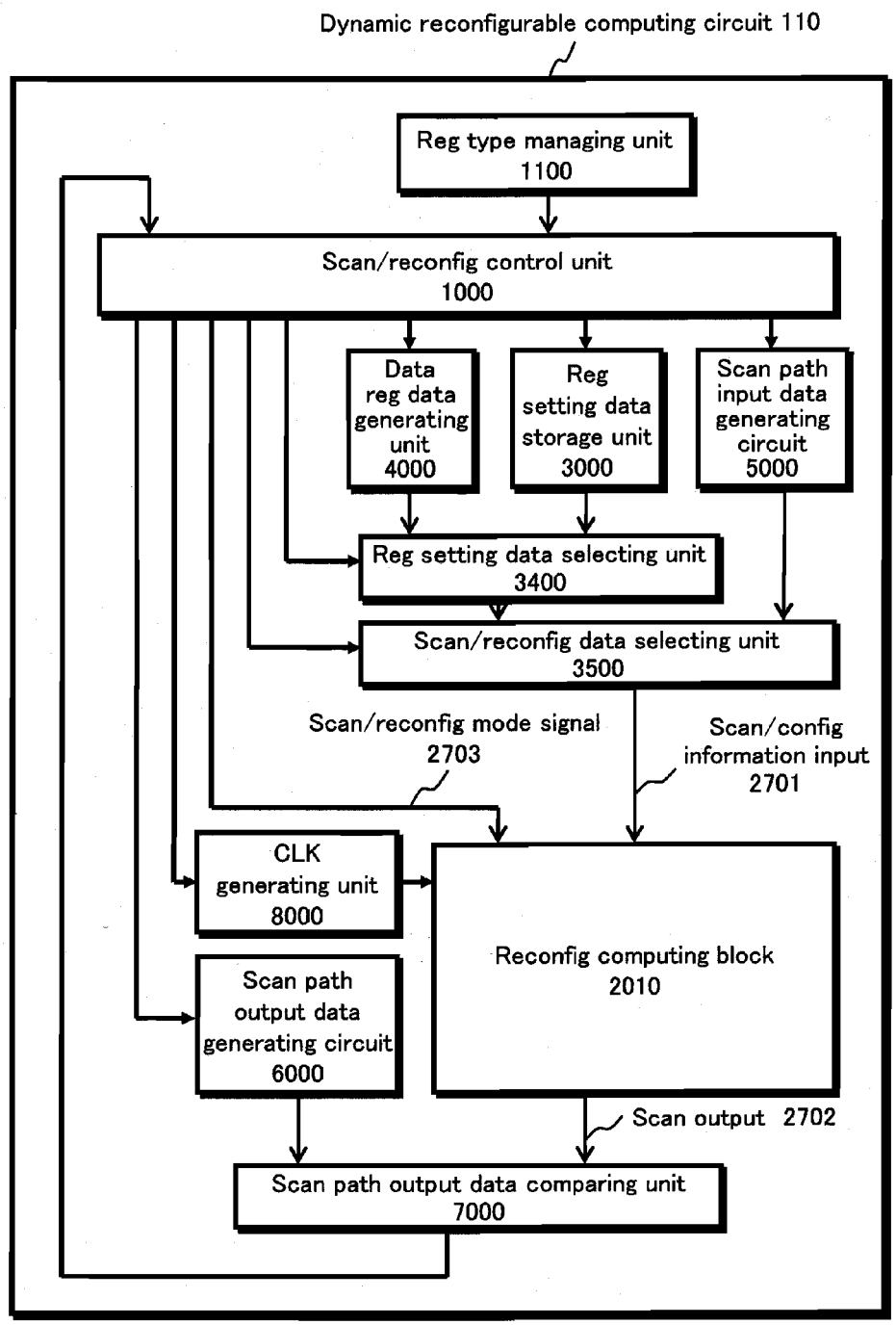
FIG. 1 is a block diagram showing the structure of the dynamic reconfigurable computing circuit 110 in Embodiment 1.

FIG. 1 is a functional block diagram showing the structure of a dynamic reconfigurable computing circuit 110 in Embodiment 1.

The dynamic reconfigurable computing circuit 110 includes a scan/reconfig control unit 1000, a reg type managing unit 1100, a reconfig computing block 2010, a scan/config information input 2701, a scan output 2702, a scan/reconfig mode signal 2703, a reg setting data storage unit 3000, a reg setting data selecting unit 3400, a scan/reconfig data selecting unit 3500, a data reg data generating unit 4000, a scan path input data generating circuit 5000, a scan path output data generating circuit 6000, a scan path output data comparing unit 7000, and a CLK generating unit 8000.

The scan/reconfig control unit 1000 performs a control to switch between (i) a scan path test in the reconfig computing block 2010 and reconfiguration and (ii) execution of an ordinary computation.

The scan/reconfig control unit 1000 sets the scan/reconfig mode signal 2703 to "1" for the scan path test and reconfiguration, and to "0" for the execution of an ordinary computation.

The data reg data generating unit 4000 generates and outputs initial values of the data registers in the reconfig computing block 2010.

In the present embodiment, the initial values are all "0".

The scan path input data generating circuit 5000, under control of the scan/reconfig control unit 1000, generates values to be set in all the config registers and data registers, during the scan path test, in the reconfig computing block 2010 which will be described later.

The reg setting data selecting unit 3400, under control of the scan/reconfig control unit 1000, selects either data stored in the reg setting data storage unit 3000 (which will be described later) or data output from the data reg data generating unit 4000, and outputs the selected data.

The scan/reconfig data selecting unit 3500 operates under control of the scan/reconfig control unit 1000.

The scan/reconfig data selecting unit 3500 selects an output from the scan path input data generating circuit 5000 during the scan path test, selects an output from the reg setting data selecting unit 3400 during the reconfiguration, and outputs the selected output to the reconfig computing block 2010.

The scan/config information input 2701 conveys an output of the scan/reconfig data selecting unit 3500 to the reconfig computing block 2010.

Figure 2:
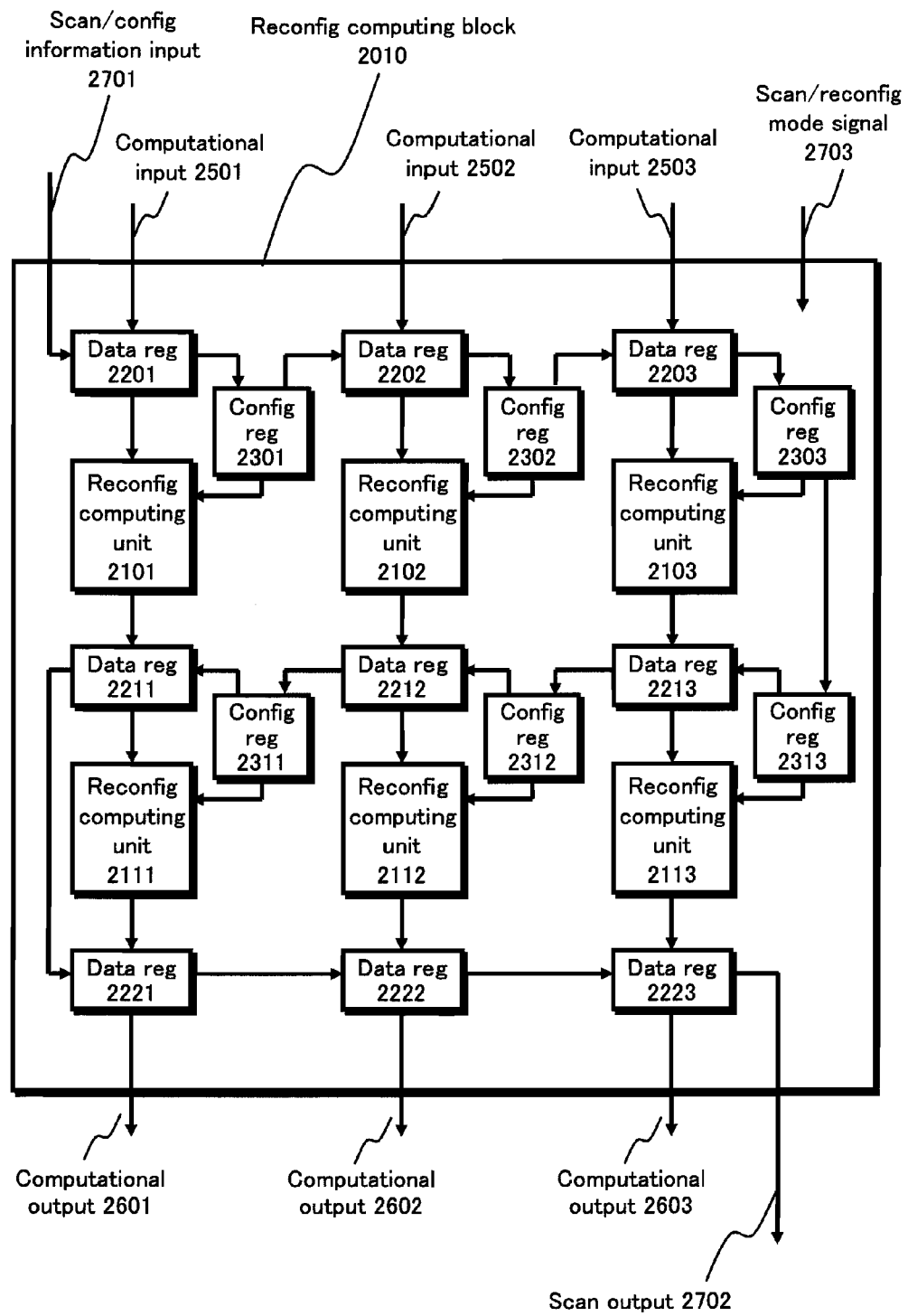
FIG. 2 is a block diagram showing the structure of the reconfig computing block 2010 in Embodiment 1.

FIG. 2 is a block diagram showing the structure of the reconfig computing block 2010.

The reconfig computing block 2010, as shown in FIG. 2, six reconfig computing units 2101, 2102, 2103, 2111, 2112 and 2113, nine data registers 2201, 2202, 2203, 2211, 2212, 2213, 2221, 2222 and 2223, and six config registers 2301, 2302, 2303, 2311, 2312 and 2313.

The reconfig computing block 2010, as shown in FIG. 2, receives computation data from outside the dynamic reconfigurable computing circuit 110 via computational inputs 2501, 2502 and 2503.

Here, a flow of computation data in the reconfig computing block 2010 will be described roughly first.

Computation data received via the computational input 2501 is processed by the data register 2201, the config, register 2301, the reconfig computing unit 2101, the data register 2211, the config registers 2311, 2111, and the data register 2221, and the results are output to an computational output 2601.

The computation data received via the computational input 2501 is stored in the data register 2201.

The reconfig computing unit 2101 performs an computation onto the data stored in the data register 2201 based on the data stored in the config register 2301, and outputs the result of the computation to the data register 2211.

The result of the computational output from the reconfig computing unit 2101 is stored in the data register 2211.

The reconfig computing unit 2111 performs an computation onto the data stored in the data register 2211 based on the data stored in the config register 2311, and outputs the result of the computation to the data register 2221.

The result of the computational output from the reconfig computing unit 2111 is stored in the data register 2221, and is also output via the an computational output 2601.

As similar to the case with the computation data received via the computational input 2501, computation data received via the computational input 2502 is processed by the data register 2202, the config register 2302, the reconfig computing unit 2102, the data register 2212, the config register 2312, the reconfig computing unit 2112, and the data register 2222, and the results are output to an computational output 2602.

Next, each constituent element of the reconfig computing block 2010 will be described in detail.

The reconfig computing units 2101, 2102, 2103, 2111, 2112 and 2113 are reconfigurable computing units, perform computations onto the data stored in the data registers 2201, 2202, 2203, 2211, 2212 and 2213, based on the data stored in the corresponding config registers 2301, 2302, 2303, 2311, 2312 and 2313, respectively.

According to this structure, when the data stored in the config registers 2301, 2302, 2303, 2311, 2312 and 2313 are changed, changed also are types of computations to be performed by reconfig computing units corresponding to the config registers with the changed data.

Here, prior to explanation of structures of the data registers and the config registers, the connection therebetween will be described.

Each of the data registers and the config registers includes a flip-flop. The flip-flops of these registers have a same clock signal (CLK), which has been input therein preliminarily, in common.

As shown in FIG. 2, the data registers and the config registers are connected in the following order: the data register 2201; the config register 2301; the data register 2202; the config register 2302; the data register 2203; the config register 2303; the config register 2313; the data register 2213; the config register 2312; the data register 2212; the config register 2311; and the data register 2211. These data registers and config registers constitute a shift register.

As an input to the shift register with the above-described structure, the scan/config information input 2701 is input to the data register 2201.

Each time the clock signal rises, each of the data registers and config registers shifts the data stored therein to the next register in the order.

Next, structures of the registers will be described.

Figure 3:
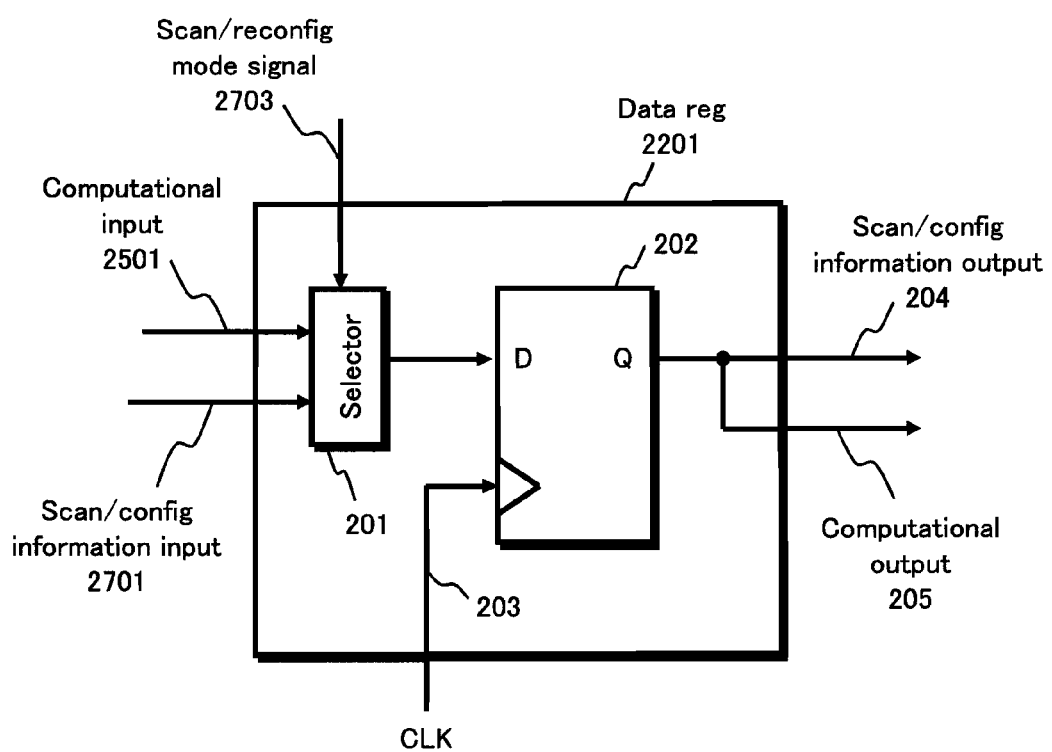
FIG. 3 is a block diagram showing the structure of the data register 2201 in Embodiment 1.

The data register 2201, as shown in FIG. 3, includes a storage unit 202, a selector 201, a CLK input line 203, an computational input 2501, a scan/config information input 2701, a scan/reconfig mode signal 2703, a scan/config information output 204, and an computational output 205.

The CLK input line 203 is connected to the CLK generating unit 8000, and conveys the clock signal (CLK) generated by the CLK generating unit 8000.

The selector 201 selects the scan/config information input 2701 as an input when the scan/reconfig mode signal 2703 is "1", selects the computational input 2501 as an input when the scan/reconfig mode signal 2703 is "0", and outputs the selected signal to the storage unit 202.

The storage unit 202 stores input data at the timing when the clock signal (CLK), which is input via the CLK input line 203, rises.

The storage unit 202 outputs the stored data via the scan/config information output 204 and the computational output 205.

The computational output 205 is connected to the reconfig computing unit 2101 that is a reconfig computing unit corresponding thereto.

The data registers 2202, 2203, 2211, 2212, 2213, 2221, 2222 and 2223 have the same structure as the data register 2201, except that they differ in connection destinations of the computational input, the scan/config information input, the scan/config information output, and the computational output.

The config registers 2301 through 2313 correspond to the reconfig computing units, and stores configuration information of the corresponding reconfig computing units, respectively.

It should be noted here that each piece of configuration information identifies a type of computation executed by a corresponding reconfig computing unit.

According to this structure, when a piece of configuration information is rewritten, the type of computation executed by the corresponding reconfig computing unit is changed.

Figure 4:
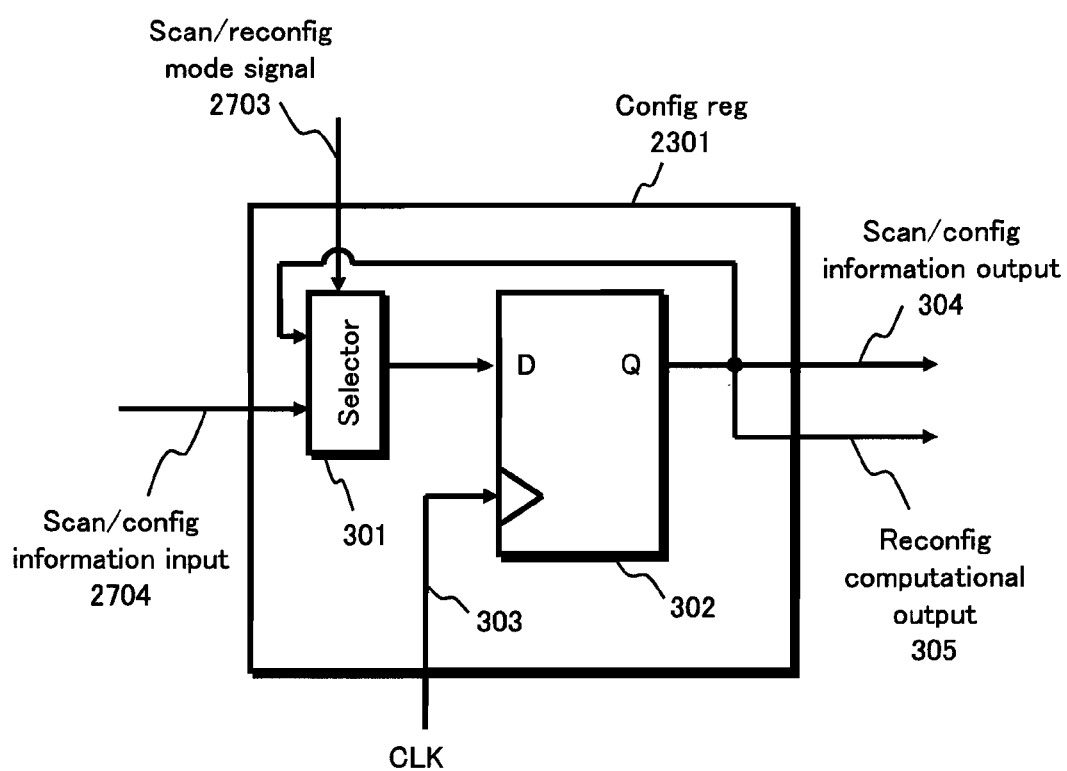
FIG. 4 is a block diagram showing the structure of the config register 2301 in Embodiment 1.

The config register 2301, as shown in FIG. 4, includes a selector 301, a storage unit 302, a CLK input line 303, a scan/config information input 2704, a scan/reconfig mode signal 2703, a scan/config information output 304, and a reconfig computational output 305.

The selector 301 selects the scan/config information input 2704 as an input when the scan/reconfig mode signal 2703 is "1", and selects an output signal from the storage unit 302 as an input when the scan/reconfig mode signal 2703 is "0", and outputs the selected signal to the storage unit 302.

The storage unit 302 stores input data at the timing when the clock signal (CLK), which is input via the CLK input line 303, rises.

The storage unit 302 outputs the stored data via the scan/config information output 304 and the reconfig computational output 305.

It should be noted here that, when the scan/reconfig mode signal 2703 is "0", the signal output from the storage unit 302 passes through the selector 301, then is input to the storage unit 302, and then is output from the storage unit 302 again, and thus the data stored in the storage unit 302 does not change during these computations.

The CLK input line 303 is connected to the CLK generating unit 8000, and conveys the clock signal (CLK) generated by the CLK generating unit 8000.

The output signal from the storage unit 302 branches into three pathways, where one re-enters the selector, another one becomes the scan/config information output 304, and the remaining one becomes the reconfig computational output 305.

The scan/config information output 304 is connected to the data register 2202 which is the next data register in the order.

The reconfig computational output 305 is connected to the reconfig computing unit 2102 that is a reconfig computing unit corresponding thereto.

The config registers 2302, 2303, 2311, 2312, and 2313 have the same structure as the config register 2301, except that they differ in connection destinations of the scan/config information input, the scan/config information output, and the output for reconfig computation unit.

The reg setting data storage unit 3000 stores configuration information that is set for the config registers 2301, 2302, 2303, 2311, 2312 and 2313 included in the reconfig computing block 2010.

Figure 5:
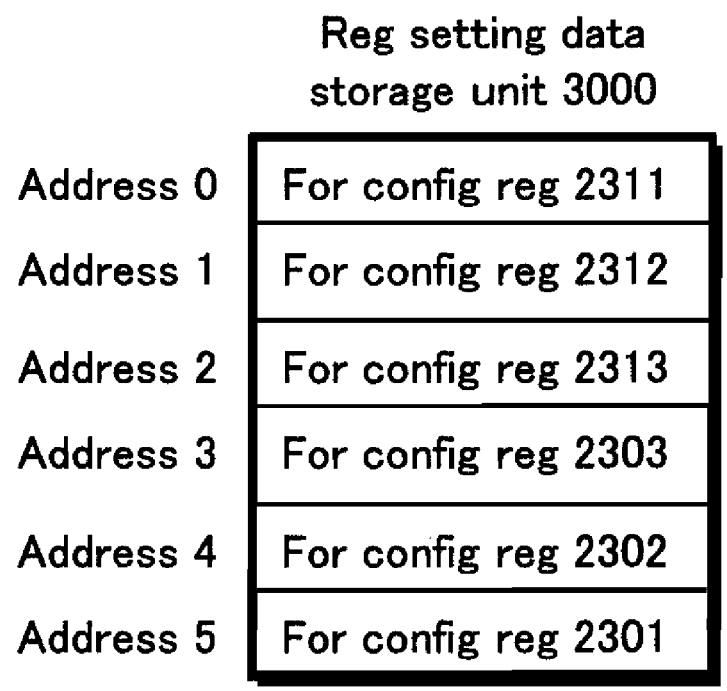
FIG. 5 shows a list of data values of the configuration information of the reg setting data storage unit 3000 in Embodiment 1.

As shown in FIG. 5, pieces of configuration information corresponding to the config registers, which are on a scan chain and constitute the aforesaid shift register in the reconfig computing block 2010, are stored in the reg setting data storage unit 3000 in the order from the one closest to the scan output 2702 to the one furthest from the scan output 2702.

The reg type managing unit 1100 stores data indicating how registers of the same type are connected continuously in the reconfig computing block 2010, namely, the reg type managing unit 1100 stores data called reg type that indicates either the data register or the config register, and stores, for each reg type, the number of continuous registers.

The data stored in the reg type managing unit 1100 will be described with reference to FIG. 6.

Each row in the reg type column indicates a type of register. More specifically, a value "0" indicates the data register, and a value "1" indicates the config register.

In the reg type managing unit 1100, the pieces of data are stored in the order from the one that corresponds to the register closest to the scan output, to the one that corresponds to the register furthest from the scan output, on the scan chain in the reconfig computing block 2010.

In the example shown in FIG. 6, the first row in the reg type managing unit 1100 includes a value "0" as the reg type, and a value "4" as the reg number, and thus indicates that four data registers are connected continuously (namely, data registers 2223, 2222, 2221, 2211).

The second row in the reg type managing unit 1100 indicates one config register (namely, config register 2311).

The scan path output data generating circuit 6000 operates under control of the scan/reconfig control unit 1000.

The scan path output data generating circuit 6000 generates expectation values of all config and data registers in the reconfig computing block 2010, for use in the scan path test.

The scan path output data comparing unit 7000, during the scan path test, makes a comparison between a scan output of the reconfig computing block 2010 and an output of the scan path output data generating circuit 6000, and conveys the result of the scan path test to the scan/reconfig control unit 1000.

The CLK generating unit 8000 generates a clock for the config and data registers in the reconfig computing block 2010.

The CLK generating unit 8000, under control of the scan/reconfig control unit 1000, generates a clock for a scan path test, a reconfiguration, or an computation in the reconfig computing block 2010.

1.2 Operation

In the following, the reconfiguration computation will be described with reference to FIGS. 7 and 8.

Figure 7:
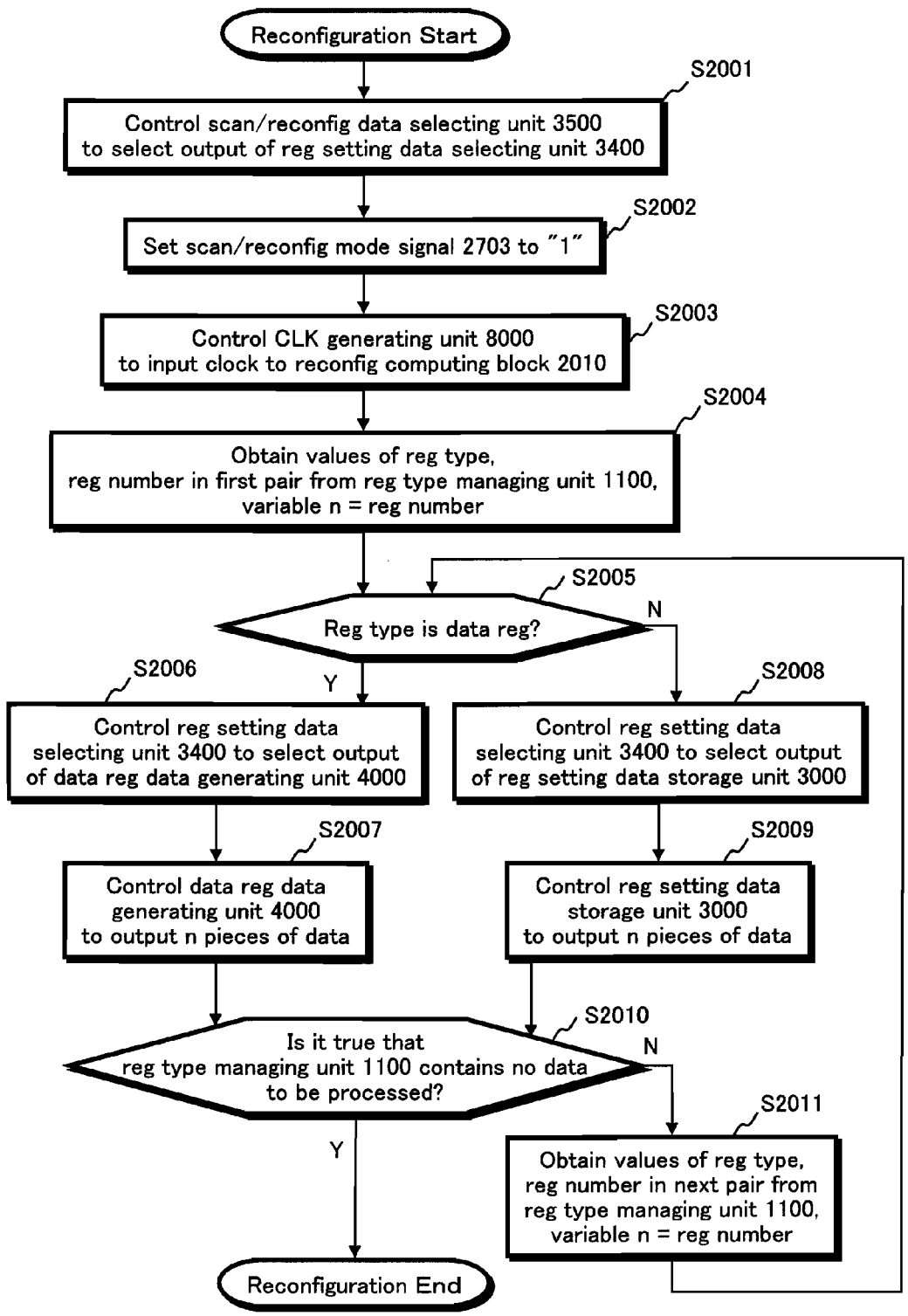
FIG. 7 is a flowchart showing the control performed by the scan/reconfig control unit 1000 in Embodiment 1.

FIG. 7 is a flowchart showing the control performed by the scan/reconfig control unit 1000 during the reconfiguration.

Figure 8:
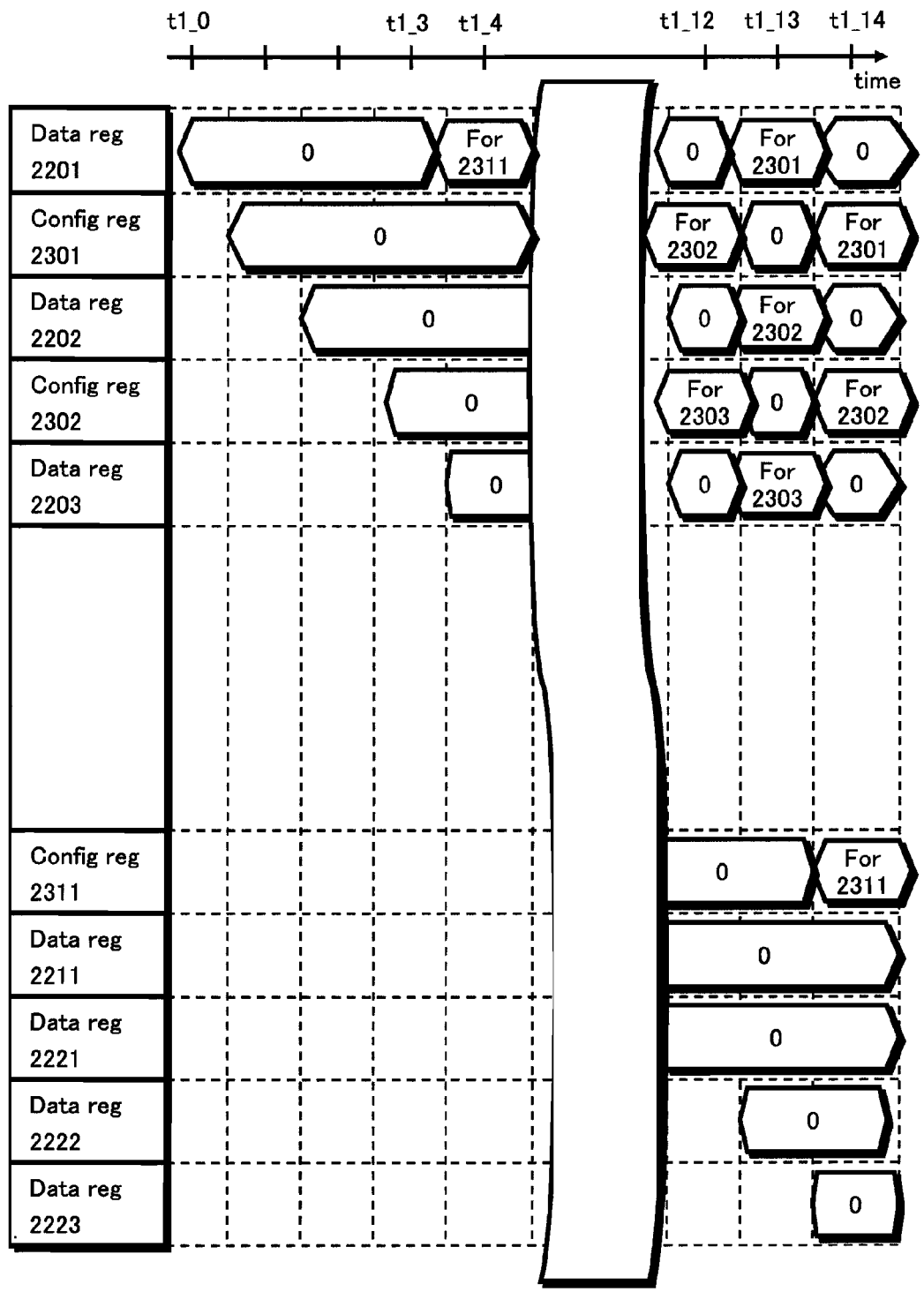
FIG. 8 is a timing chart showing timings of data storage in each register during the reconfiguration in Embodiment 1.

FIG. 8 shows of data storage in each register during the reconfiguration.

In step S2001, the scan/reconfig control unit 1000 controls the scan/reconfig data selecting unit 3500 to select an output of the reg setting data selecting unit 3400.

In step S2002, the scan/reconfig mode signal 2703 is set to "1".

In step S2003, the scan/reconfig control unit 1000 controls the CLK generating unit 8000 to input a clock to the reconfig computing block 2010.

In step S2004, values of reg type and reg number in the first pair are obtained from the reg type managing unit 1100.

In the present example, the value of reg type indicates the data register, and thus it is judged as "Y" in step S2005.

In step S2006, the scan/reconfig control unit 1000 controls the reg setting data selecting unit 3400 to select an output of the data reg data generating unit 4000.

In step S2007, the scan/reconfig control unit 1000 controls the data reg data generating unit 4000 to generate as many "0"s as the number of pieces of data indicated by the reg number. In the present example, the reg number is "4" indicating four pieces of data, and thus the scan/reconfig control unit 1000 controls the data reg data generating unit 4000 to generate four "0"s. Also, the CLK generating unit 8000 generates a clock so that the four pieces of data can be input in sequence from the scan/config information input 2701.

It is presumed here that at time t1_3 when the four pieces of data are input to the reconfig computing block 2010, the data registers 2201 and 2202 and the config registers 2301 and 2302 have been set to "0".

In step S2010, it is judged whether or not it is true that the reg type managing unit 1100 contains no data to be processed. In the present example, the reg type managing unit 1100 still contains data to be processed, and thus it is judged as "N". In step S2011, values of reg type and reg number in the next pair are obtained from the reg type managing unit 1100.

The control goes to step S2005. In the present example, the value of the second reg type indicates the config register, and thus it is judged as "N" in step S2005.

In step S2006, the scan/reconfig control unit 1000 controls the reg setting data selecting unit 3400 to select an output of the reg setting data storage unit 3000.

In step S2009, the scan/reconfig control unit 1000 controls the reg setting data storage unit 3000 to output as many pieces of data indicated by the reg number. In the present example, the second reg number is "1", and thus the scan/reconfig control unit 1000 controls the reg setting data storage unit 3000 to output a piece of data.

Also, the CLK generating unit 8000 generates a clock so that the piece of data can be input from the scan/config information input 2701.

It is presumed here that at time t1_4 when the piece of data is input to the reconfig computing block 2010, the data registers 2202 and 2203 and the config registers 2301 and 2302 have been set to "0", and the data register 2201 has been set to the configuration information data for the config register 2311.

After this, the process continues until, in step S2010, it is judged that it is true that the reg type managing unit 1100 contains no data to be processed (judged as "Y" in step S2010). In the present example, it is judged as "Y" in step S2010 at time t1_14. With this, the reconfiguration process ends.

At time t1_14, the configuration information data corresponding to all the config registers has been stored, and value "0" is stored in all the data registers.

2. Embodiment 2

In Embodiment 2, different from Embodiment 1, scan/config information buses are connected with an intention that registers of the same type, which is indicated by the reg type, are connected continuously in the reconfig computing block 2010.

Since registers of the same type connected continuously can be represented as one piece of data, it is possible to reduce the amount of data to be stored in the reg type managing unit 1100.

It is thus possible to further restrict the area of hardware required for achieving the reg type managing unit 1100, compared with Embodiment 1.

In Embodiment 2, 20% of the config and data registers in total are connected continuously.

In the case where the total number of config and data registers ranges from several thousands to several hundreds of thousands, continuous connection of approximately 10% of registers in total would produce a prominent advantageous effect of reducing the amount of data in the reg type managing unit 1100.

Unless they are connected intentionally, there would hardly be a case where 10% or more of the config and data registers in total are connected continuously.

Specifically, Embodiment 2 differs from Embodiment 1 with respect to the block diagram of the reconfig computing block 2010 shown in FIG. 2, the list of data values of the configuration information of the reg setting data storage unit 3000 shown in FIG. 5, the values of the types and number of registers stored in the reg type managing unit 1100 shown in FIG. 6, and the timings of data storage in each register during the reconfiguration shown in FIG. 8.

Embodiment 2 has FIGS. 9 through 12 corresponding to FIGS. 2, 5, 6, and 8 of Embodiment 1.

Figure 9:
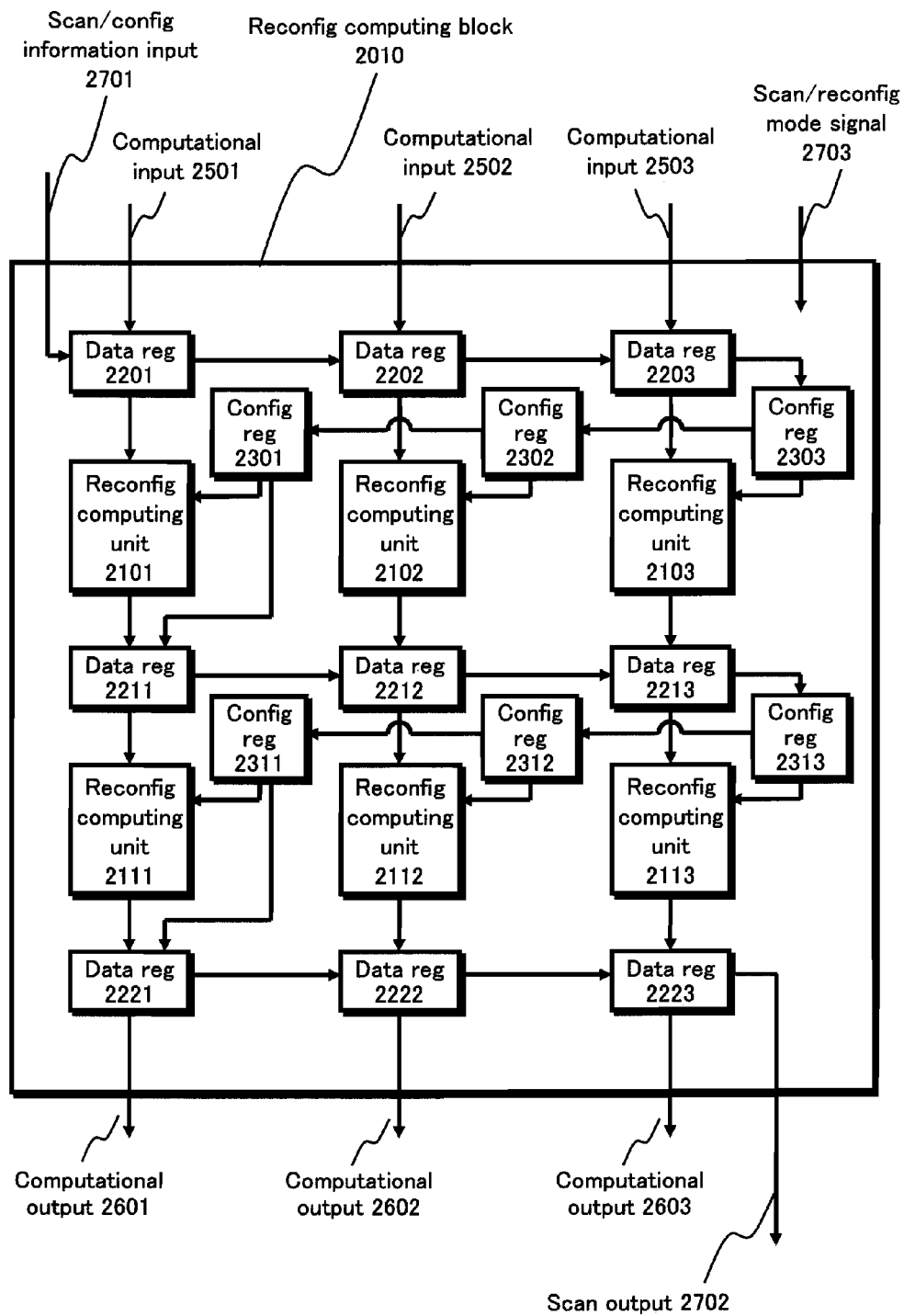
FIG. 9 is a block diagram showing the structure of the reconfig computing block 2010 in Embodiment 2.

FIG. 9 is a block diagram showing the structure of the reconfig computing block 2010 in Embodiment 2, and corresponds to FIG. 2 of Embodiment 1.

FIG. 10 shows a list of data values of the configuration information of the reg setting data storage unit 3000 in Embodiment 2, and corresponds to FIG. 5 of Embodiment 1.

FIG. 11 shows values of the types and number of registers stored in the reg type managing unit 1100 in Embodiment 2, and corresponds to FIG. 6 of Embodiment 1.

Figure 12:
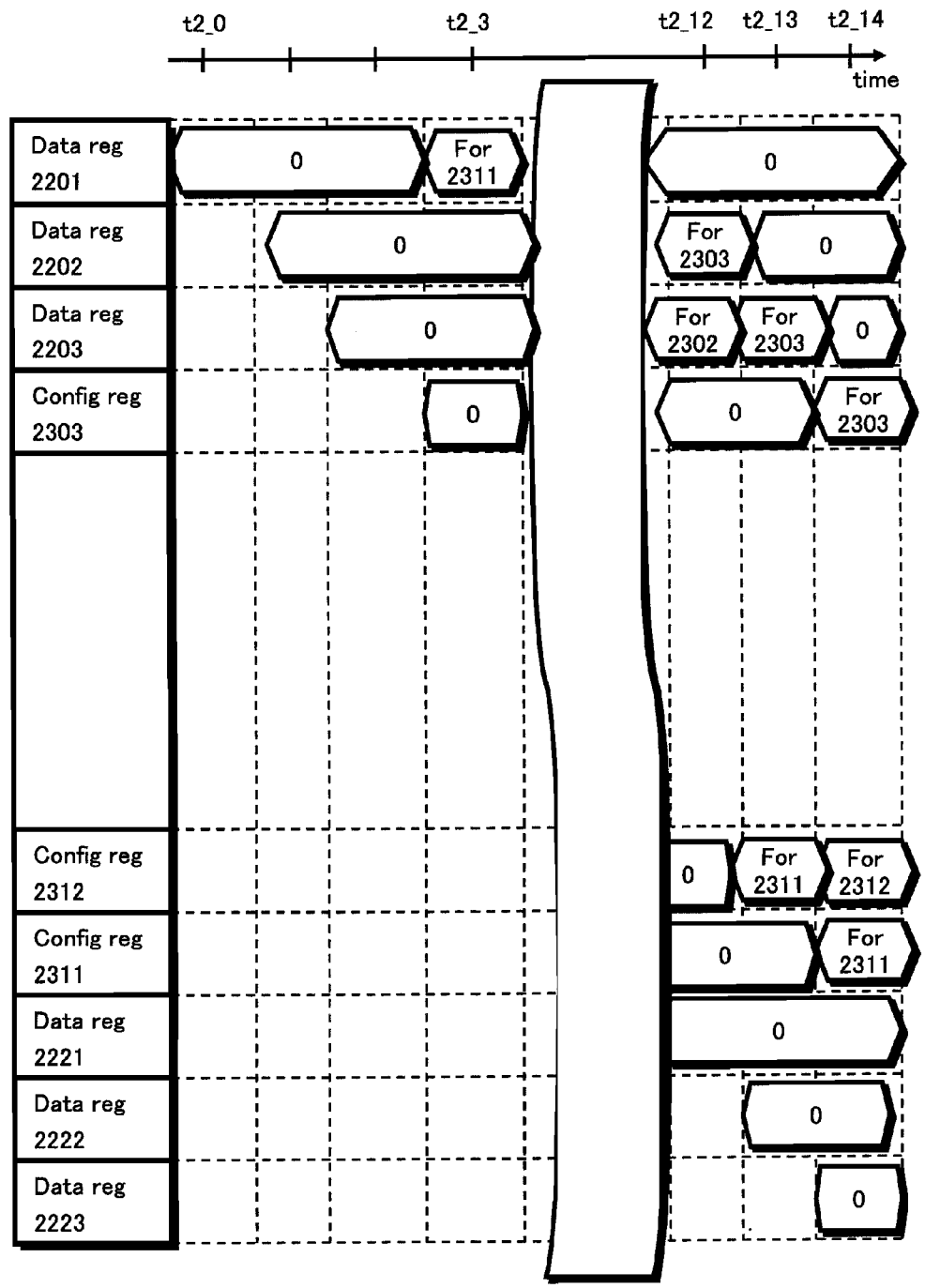
FIG. 12 is a timing chart showing timings of data storage in each register during the reconfiguration in Embodiment 2.

FIG. 12 shows timings of data storage in each register during the reconfiguration in Embodiment 2, and corresponds to FIG. 8 of Embodiment 1.

With these changes in the connection structure, the data stored in the reg setting data storage unit 3000 and the reg type managing unit 1100 in Embodiment 2 differs from that in Embodiment 1.

It should be noted here that in these figures of Embodiment 2, the same constituent elements as in Embodiment 1 have been assigned with the same reference numbers.

3. Embodiment 3

Embodiment 3 differs from Embodiment 2 in that the data register is further classified into two types.

In Embodiments 1 and 2, only two reg type values "0" and "1" are used to indicate the types of registers; in Embodiment 3, three reg type values "0", "1" and "2" are used to indicate the types of registers, with value "2" newly added.

Here, the reg type value "0" indicates a data register that is initialized to "0", and the reg type value "2" indicates a data register that is initialized to "1".

With this structure, it is possible to initialize data registers to a value other than "0".

Specifically, Embodiment 3 differs from Embodiment 2 with respect to the flowchart of the control performed by the scan/reconfig control unit 1000 shown in FIG. 7, the values of the types and number of registers stored in the reg type managing unit 1100 shown in FIG. 11, and the timings of data storage in each register during the reconfiguration shown in FIG. 12.

Figure 13:
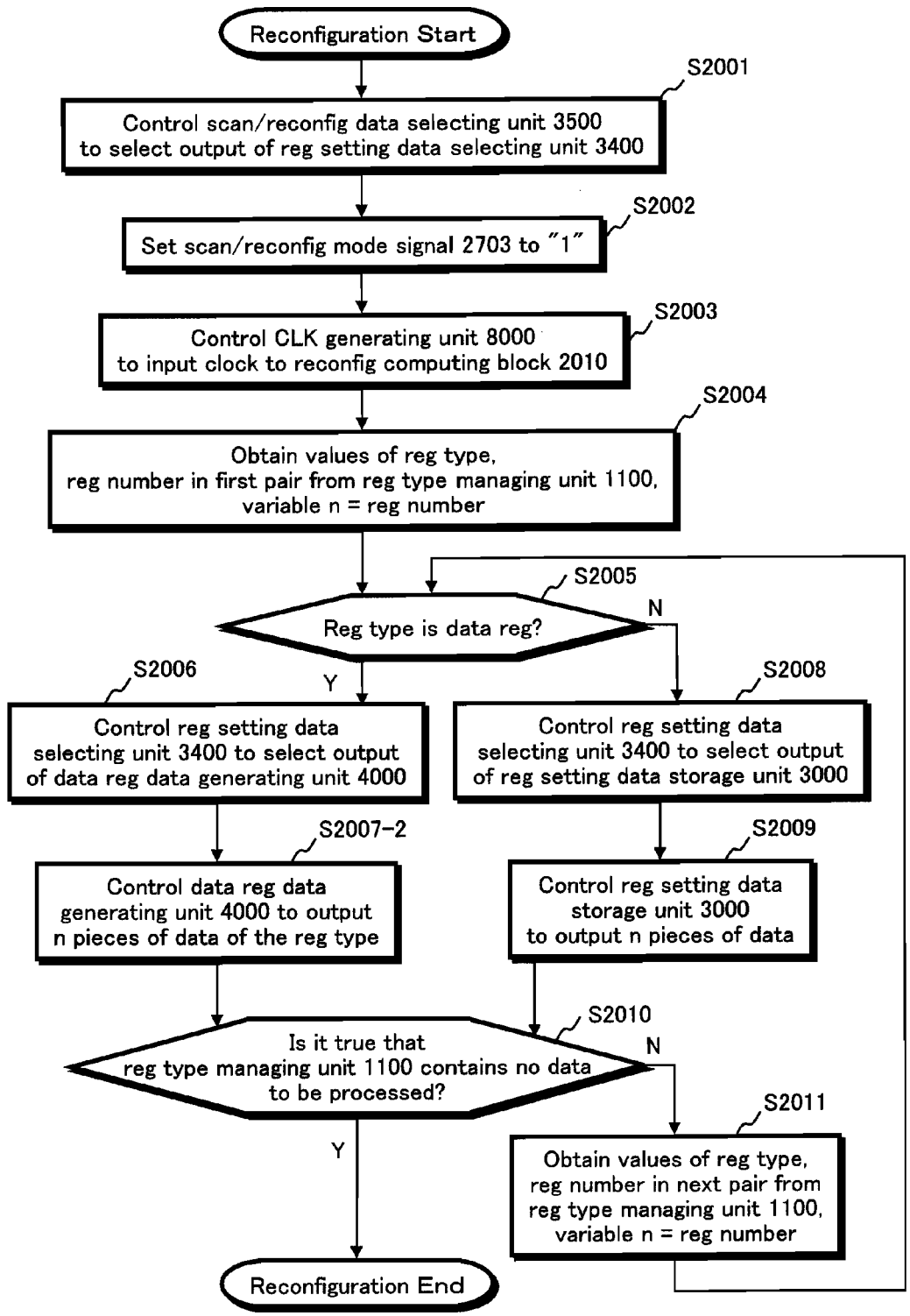
FIG. 13 is a flowchart showing the control performed by the scan/reconfig control unit 1000 in Embodiment 3.
Figure 15:
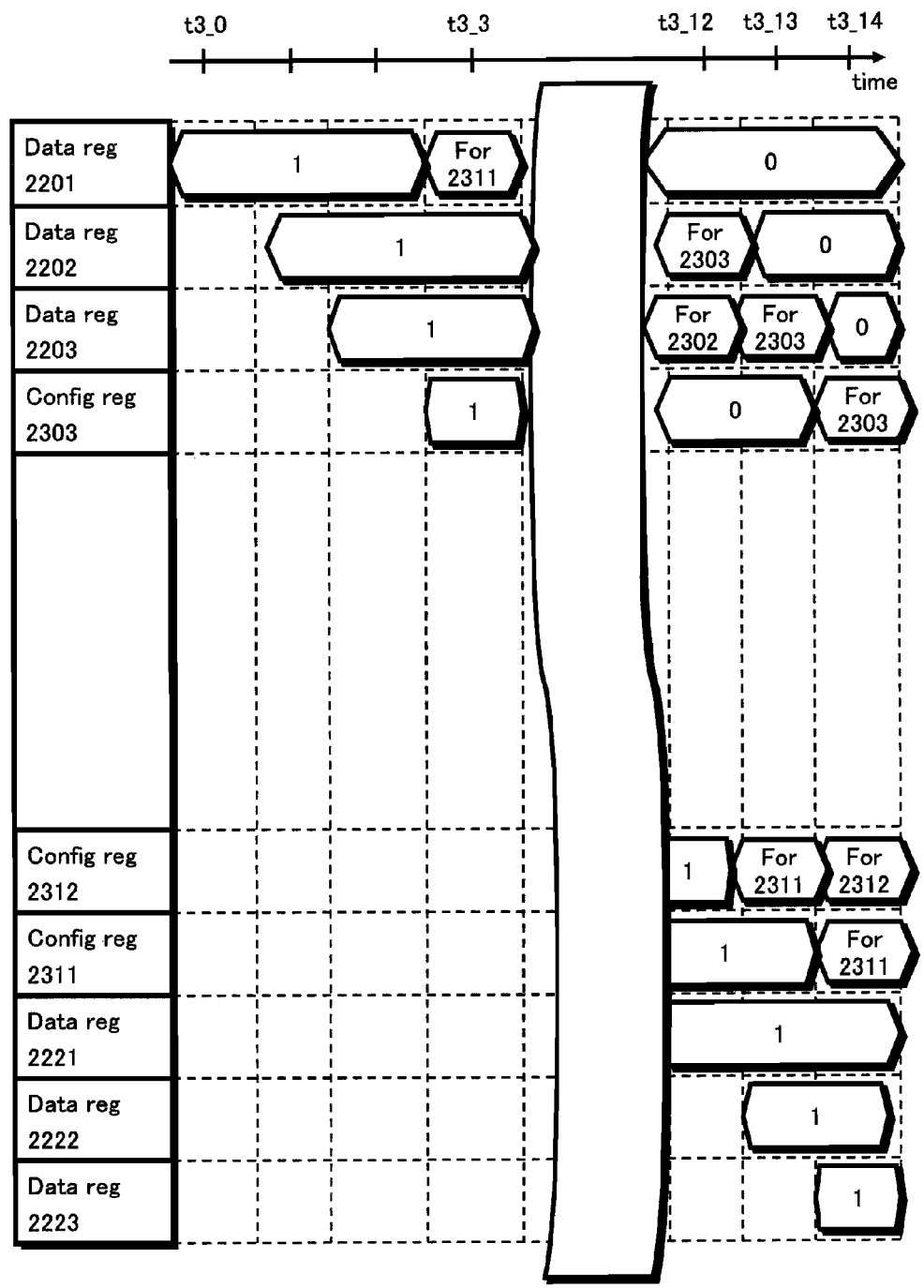
FIG. 15 is a timing chart showing timings of data storage in each register during the reconfiguration in Embodiment 3.

Embodiment 3 has FIGS. 13 through 15 corresponding to FIGS. 7, 11, and 12 of Embodiment 2.

FIG. 14 shows values of the types and number of registers stored in the reg type managing unit 1100 in Embodiment 3.

The reg type value "0" indicates a data register that is initialized to "0", as is the case with Embodiment 1 and 2.

The reg type value "1" indicates the config register, as is the case with Embodiment 1 and 2.

The reg type value "2" indicates a data register that is initialized to "1".

FIG. 13 is a flowchart of the control performed by the scan/reconfig control unit 1000 in Embodiment 3.

FIG. 13 includes step S2007-2 in place of step S2007 included in Embodiments 1 and 2.

In step S2007-2, the scan/reconfig control unit 1000 controls the data reg data generating unit 4000 to generate as many values according to the reg type value as the number of pieces of data indicated by the reg number.

FIG. 15 shows timings of data storage in each register during the reconfiguration in Embodiment 3.

As described above, when the reg type value is "2", the corresponding data register is initialized to "1".

It should be noted here that in these figures of Embodiment 3, the same constituent elements as in Embodiment 2 have been assigned with the same reference numbers.

4. Embodiment 4

Embodiment 4 differs from Embodiment 1 in that two scan/config information buses are used.

With this structure, it is possible to improve the input speed during the scan path test and reconfiguration.

Specifically, Embodiment 4 differs from Embodiment 1 with respect to the block diagram of the reconfig computing block 2010 shown in FIG. 2.

Figure 16:
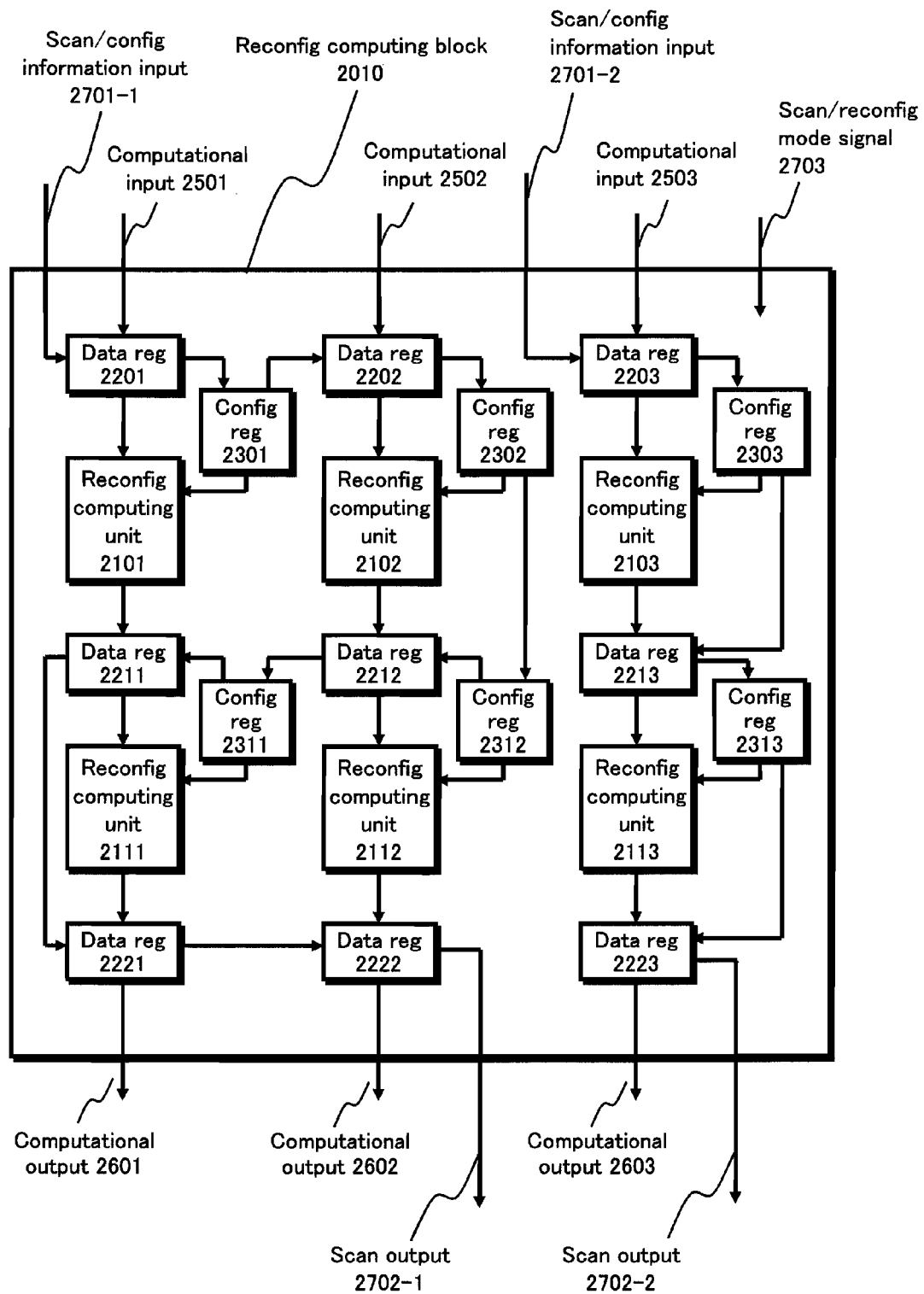
FIG. 16 is a block diagram showing the structure of the reconfig computing block 2010 in Embodiment 4.

Embodiment 4 has FIG. 16 corresponding to FIG. 2 of Embodiment 1.

FIG. 16 is a block diagram showing the structure of the reconfig computing block 2010 in Embodiment 4.

It should be noted here that the same constituent elements as in Embodiment 1 are assigned with the same reference numbers, and description thereof is omitted.

5. Embodiment 5

Embodiment 5 differs from Embodiment 1 in that the scan path input data generating circuit 5000, the scan path output data generating circuit 6000 and the scan path output data comparing unit 7000, which are embedded in the dynamic reconfigurable computing circuit 110 in Embodiment 1, are provided outside the circuit.

With this structure, it is possible to input data from outside during the scan path test and reconfiguration, and it is possible to make comparisons for the scan path test, using an external circuit.

Figure 17:
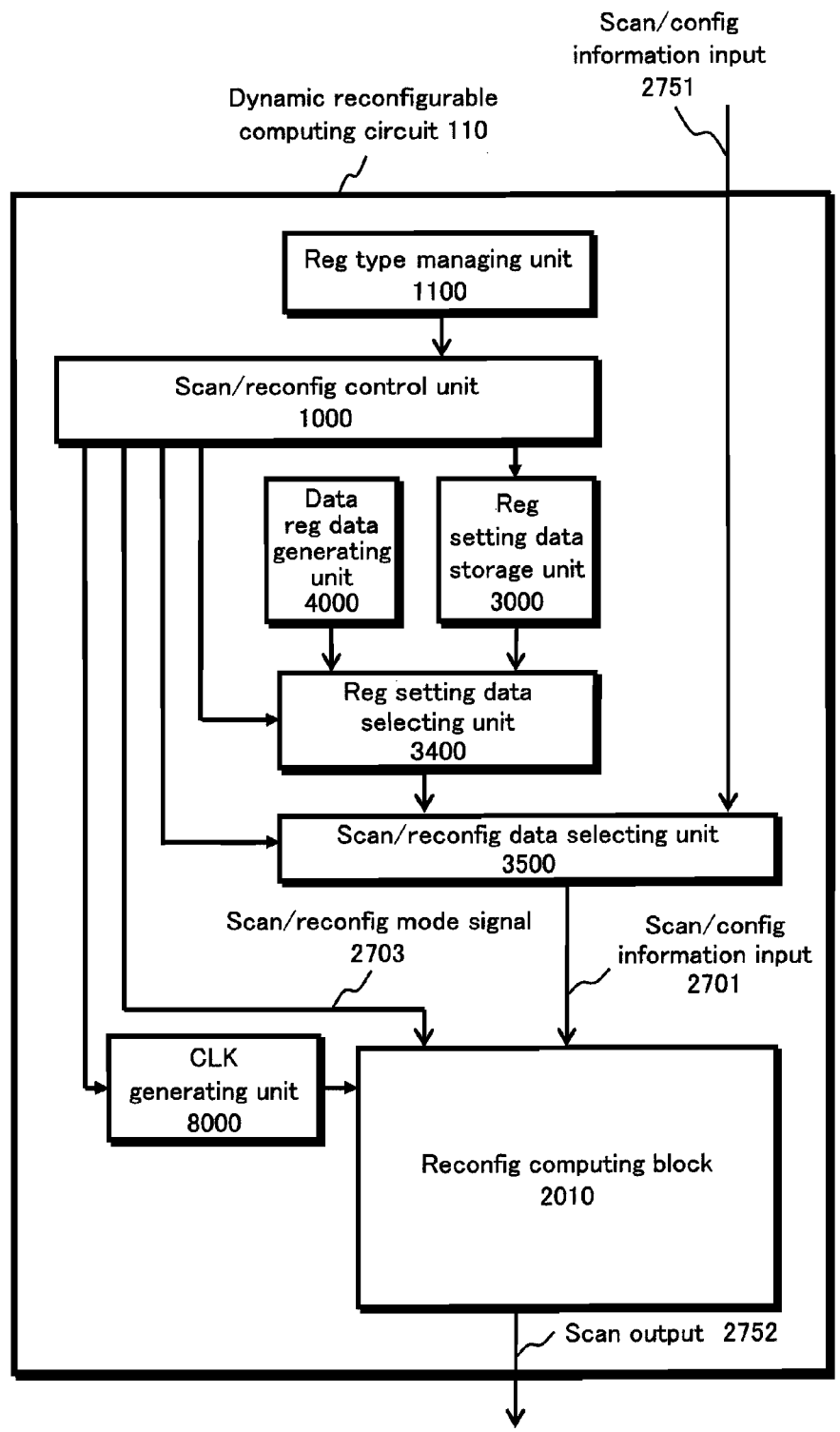
FIG. 17 is a block diagram showing the structure of the dynamic reconfigurable computing circuit 110 in Embodiment 5.

FIG. 17 is a block diagram showing the structure of the dynamic reconfigurable computing circuit 110 in Embodiment 5.

It should be noted here that the same constituent elements as in Embodiment 1 are assigned with the same reference numbers, and description thereof is omitted.

6. Embodiment 6

Figure 18:
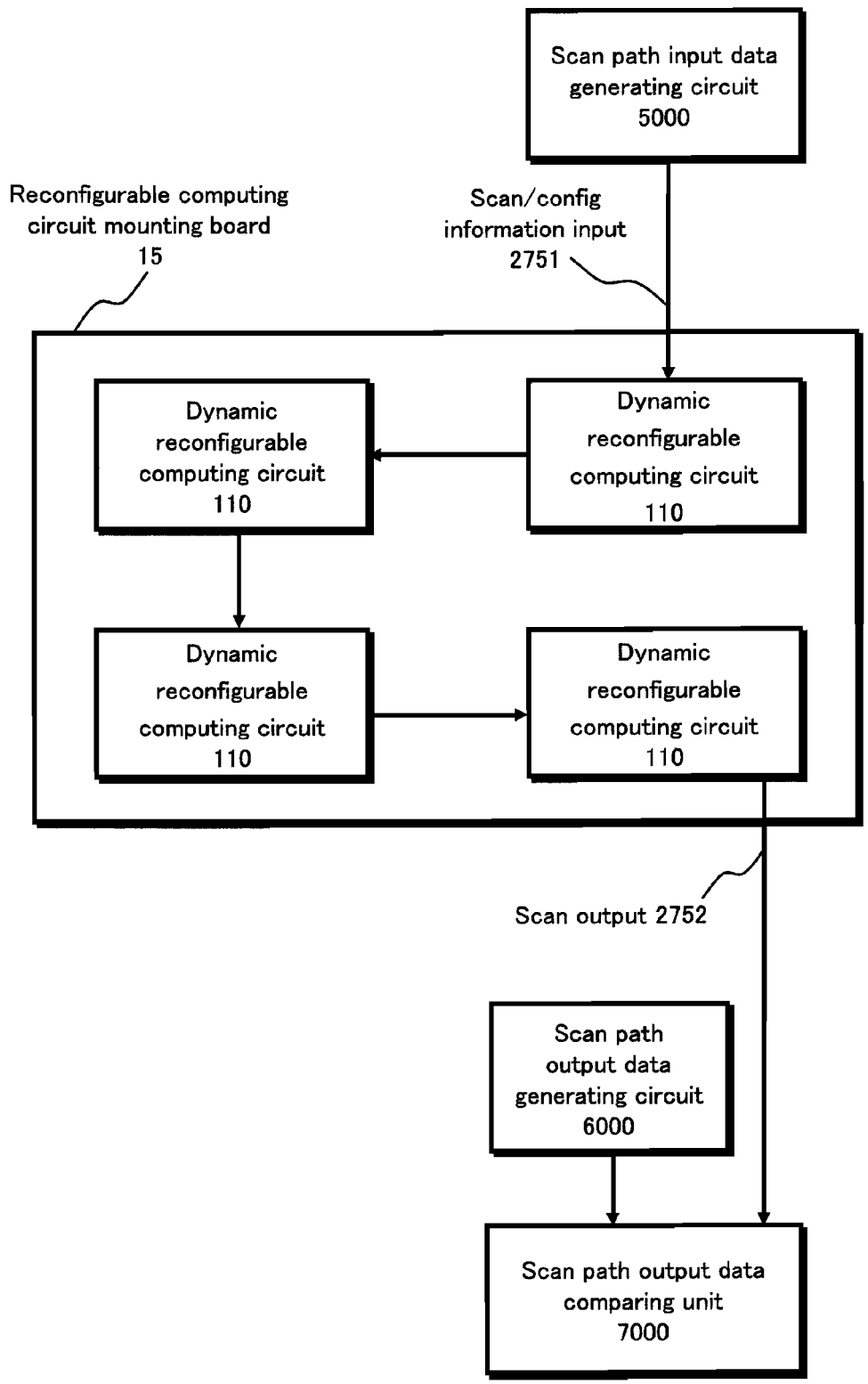
FIG. 18 is a block diagram showing the structure of the reconfigurable computing circuit mounting board 15 in Embodiment 6.

Embodiment 6 has a structure shown in FIG. 18, where a plurality of dynamic reconfigurable computing circuits 110, which have the structure explained in Embodiment 5, are connected in series on a reconfigurable computing circuit mounting board 15.

Four dynamic reconfigurable computing circuits 110 are mounted on the reconfigurable computing circuit mounting board 15, and the scan/config information inputs 2701 and the scan outputs 2702 are connected like a chain.

During the scan path test and the reconfiguration, data is input from a scan/config information input 2751 and data is output from a scan output 2752.

With this structure, it is possible to change the scan path test and configuration in units of boards on each of which a plurality of reconfigurable computing circuits are mounted.

It should be noted here that the same constituent elements as in Embodiment 5 are assigned with the same reference numbers, and description thereof is omitted.

7. Embodiment 7

In Embodiment 7, the circuits explained in the embodiments above are applied to a mobile communication device such as a mobile phone.

Figure 19:
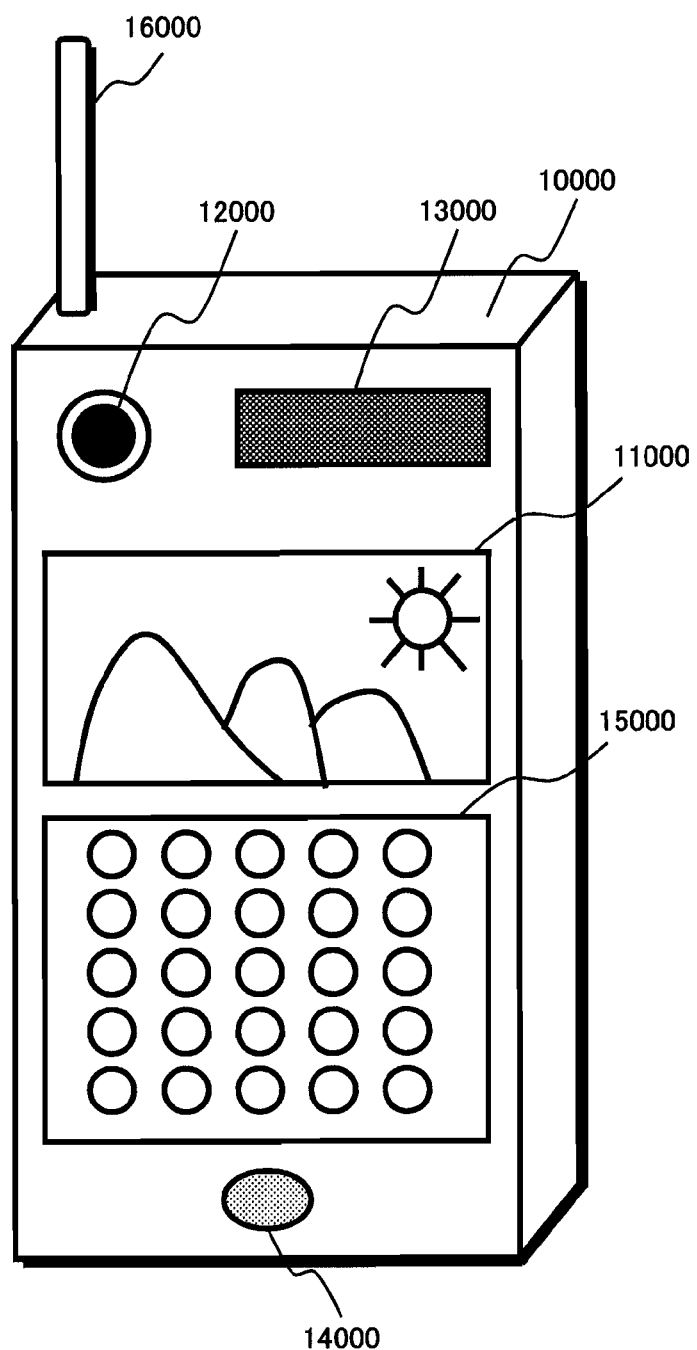
FIG. 19 shows a mobile communication device using the dynamic reconfigurable computing circuit 110 in Embodiment 7.

FIG. 19 shows a mobile communication device in Embodiment 7.

A mobile communication device 10000 includes a display 11000, an imaging unit 12000, an audio output unit 13000, an audio input unit 14000, a command input unit 15000, an antenna 16000, and a dynamic reconfigurable computing circuit 110.

The dynamic reconfigurable computing circuit 110 has the same structure as in Embodiment 1.

It should be noted here that the same constituent elements as in Embodiment 1 are assigned with the same reference numbers, and description thereof is omitted.

The dynamic reconfigurable computing circuit 110 is connected to the display 11000 via a video frame buffer.

The dynamic reconfigurable computing circuit 110 performs a process of decoding still images such as JPEG images, a process of decoding moving images such as MPEG images, a process of dealing with three-dimensional graphics such as games, a process of drawing texts, and a process of combining different types of images.

The display 11000 displays the images processed by the dynamic reconfigurable computing circuit 110.

The dynamic reconfigurable computing circuit 110 is also connected to the imaging unit 12000 via a video frame buffer.

The dynamic reconfigurable computing circuit 110 performs, onto the images input from the imaging unit 12000, a process of encoding still images in compliance with the JPEG standard or the like, a process of encoding moving images in compliance with the MPEG standard or the like.

The dynamic reconfigurable computing circuit 110 is also connected to the audio output unit 13000 via an audio frame buffer.

The dynamic reconfigurable computing circuit 110 performs a process of decoding audio data such as MPEG audio data.

The audio output unit 13000 outputs audio having been processed by the dynamic reconfigurable computing circuit 110.

The dynamic reconfigurable computing circuit 110 is also connected to the audio input unit 14000 via an audio frame buffer.

The dynamic reconfigurable computing circuit 110 performs, onto the audio input from the audio input unit 14000, a process of encoding audio data in compliance with the MPEG standard or the like.

There are various types of audio process standards and video process standards such as JPEG and MPEG, and the processes should be performed properly in compliance with the standards.

In the present embodiment, when the standard changes and the process to be performed changes accordingly, the reconfig computing block 2010 is used to process a part that burdens the processor. With this structure, it is possible to perform processes smoothly in compliance with a plurality of standards.

The dynamic reconfigurable computing circuit 110 is connected to the antenna 16000 and to a radio frequency circuit (not illustrated), and performs a communication process. In this aspect, the dynamic reconfigurable computing circuit 110 constitutes a radio network.

The dynamic reconfigurable computing circuit 110 also performs processes of encrypting and decrypting transmission/reception data.

There are various types of encryption standards as is the case with the above-described audio process standards and video process standards, and the processes should be performed properly in compliance with the encryption standards.

In the present embodiment, when the standard changes and the process to be performed changes accordingly, the reconfig computing. block 2010 is used to process a part that burdens the processor. With this structure, it is possible to perform processes smoothly in compliance with a plurality of standards.

The mobile communication device 10000 allows the user to input a command therein on the command input unit 15000, using a needle or fingers.

Not only in the above-described example of the mobile communication device, but in most of communication systems, video processing systems, and security processing systems, the terminal devices or the like need to handle a plurality of standards.

Therefore, the present invention can be applied to these systems to obtain the advantageous effects of the present invention.

Also, the present invention is useful not only for the above-described mobile communication device, but for image display devices such as TVs, DVD (Digital Versatile Disc) players, and car navigation systems, image recording devices such as DVD recorders, video cameras, DSCs (Digital Still Cameras), and security cameras, devices such as audio players, communication units in communication devices, communication systems, and security processing systems.

8. Supplementary Notes and Modifications

Up to now, the present invention has been described through several embodiments thereof. However, the present invention is not limited to the embodiments, but can be modified in various manners unless such modifications depart from the scope of the present invention. For example, the present invention includes the following modifications The dynamic reconfigurable computing circuit 110 described in the embodiments above may partially be modified as follows.

(1) In Embodiments 1 through 5, the reconfig computing units are arranged in a matrix of 2 rows×3 columns in the reconfig computing block 2010. However, not limited to this, the reconfig computing units may be arranged, for example, in a rectangular matrix of 10 rows×4 columns.

Also, the reconfig computing units may be arranged in any format. For example, the reconfig computing units may be arranged in units of lines.

As described in the embodiments above, the types of computations to be performed by reconfig computing units can be changed. Furthermore, the reconfig computing units may perform many types of computations, such as multiplication, shift, addition, logic operation, division, subtraction, and rotate operation.

Also, in the above-described embodiments, the reconfig computing units have the same structure. However, the reconfig computing units may have different structures. For example, only predetermined reconfig computing units may be able to perform division.

In the above-described embodiments, the types of computations to be performed by all the reconfig computing units can be changed. However, not limited to this, the types of computations to be performed by some reconfig computing units may not be changed.

In the above-described embodiments, how the data registers are connected is uniquely determined. However, the connection structure of the data registers may be changed depending on the data stored in the config registers.

In the above-described embodiments, the reconfig computing units are 1-input, 1-output. However, not limited to this, the number of inputs/outputs may be modified. For example, the reconfig computing units may be 3-input, 2-output.

In this case, the number of pieces of data to be received by a data register may be increased as much.

In the above-described embodiments, all reconfig computing units operate based on the same clock. However, a plurality of clock lines may be provided so that each reconfig computing unit can have a different clock.

(2) In Embodiment 1 through 5, only one reg setting data storage unit 3000 is provided. However, not limited to this, a plurality of reg setting data storage units 3000 may be provided.

In this case, the number of scan/config information inputs 2701 may be increased depending on the number of reg setting data storage units 3000.

(3) In Embodiment 1 through 5, the scan/config information buses are connected with all the registers in the reconfig computing block 2010. However, not limited to this, some registers in the reconfig computing block 2010 may not be connected with scan/config information buses.

In this case, a partial scan is performed in the scan path test.

(4) In Embodiment 1 through 5, the dynamic reconfigurable computing circuit 110 includes the data reg data generating unit 4000 and the reg setting data selecting unit 3400. However, not limited to this, the dynamic reconfigurable computing circuit 110 may not include the data reg data generating unit 4000 and the reg setting data selecting unit 3400. In this case, during a reconfiguration, addresses are changed after data is read out from the reg setting data storage unit 3000 at the timing at which data for config registers is input, but merely data is read out from the reg setting data storage unit 3000 at the timing at which data for data registers is input.

With this structure, dummy data is set in the data registers.

(5) Although not particularly described in the embodiments above, the advantageous effects can also be obtained with merely a structure where the config registers and the data registers are intentionally connected continuously in the scan path.

For example, in the scan path, a plurality of config registers may be connected continuously to be followed by a plurality of data registers connected continuously.

When config information is stored into the config registers, it is not necessary to store data into the data registers since the data is later replaced with data for computations.

In this case, a shift operation may be performed so that data is stored only into a plurality of config registers, and after desired data is stored into each config register, the shift operation is ended.

This eliminates unnecessary operations in the shift operation, and thus contributes to an efficient shift operation.

(6) Each of the above-described devices is specifically a computer system that includes a microprocessor, ROM, RAM, a hard disk unit, a display unit, a keyboard, a mouse, and the like. A computer program is stored in the RAM or the hard disk unit. The microprocessor operates in accordance with the computer program and causes each device to achieve the functions. Here, the computer program is a combination of a plurality of instruction codes indicating instructions to a computer.

It should be noted here that each device is not limited to a computer system that includes all of a microprocessor, ROM, RAM, a hard disk unit, a display unit, a keyboard, a mouse, and the like, but may be a computer system that is composed of part of these units.

(7) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, and RAM. A computer program is stored in the RAM. The microprocessor operates in accordance with the computer program, thereby enabling the system LSI to achieve its functions. Each of these units may be achieved separately as one chip, or part or all of these units may be achieved as one chip.

It should be noted here that although the term LSI is used here, it may be called IC, system LSI, super LSI, ultra LSI or the like, depending on the level of integration.

Also, the integrated circuit may not necessarily be achieved by the LSI, but may be achieved by the dedicated circuit or the general-purpose processor. It is also possible to use the FPGA (Field Programmable Gate Array), with which a programming is available after the LSI is manufactured, or the reconfiguration processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(8) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(9) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted via an electric communication line, a wireless or wired communication line, a network of which the Internet is representative, or a data broadcast.

Furthermore, by transferring the program or the digital signal via the recording medium, or by transferring the program or the digital signal via the network or the like, the program or the digital signal may be executed by another independent computer system.

(10) The present invention may be any combination of the above-described embodiments and modifications.

INDUSTRIAL APPLICABILITY

The present invention is able to restrict the capacity of the reg setting data storage unit 3000, and thus is suitable for a media processing device in which reconfigurable computing circuit is used. Also, the present invention is applicable to the usage where a plurality of standards need to be handled.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A reconfigurable computing circuit comprising:
a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each of the configuration registers and each of the data registers shifts to next connected register in the series, with input information being stored into a starting register of the series;
a first storage unit storing one or more pieces of configuration information arranged in a predetermined order so as to be stored into the configuration registers;
a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group;
a generating unit operable to generate an initial value; and
a control unit operable to read, one by one, the plurality of pieces of group information from the second storage unit, judge a register type from a read piece of group information, and when the judged register type is data register, output the initial value, in synchronization with the shift instruction, to the reconfigurable computing block as many times as the number of registers indicated by the read piece of group information, and when the judged register type is configuration register, read as many pieces of configuration information from the first storage unit one by one as the number of registers indicated by the read piece of group information, and output the pieces of configuration information read from the first storage unit to the reconfigurable computing block one by one in synchronization with the shift instruction.

2. The reconfigurable computing circuit of claim 1, wherein
at least a predetermined number of configuration registers or at least a predetermined number of data registers are connected continuously in the series.

3. The reconfigurable computing circuit of claim 2, wherein
the predetermined number is approximately 10% of a total number of registers.

4. The reconfigurable computing circuit of claim 1, wherein
the register type in each piece of group information indicates, by a different value, either a data register whose initial value is a first value or a data register whose initial value is a second value, and
the control unit outputs the first value, as the initial value, to the reconfigurable computing block when the register type indicates the data register whose initial value is the first value, and outputs the second value, as the initial value, to the reconfigurable computing block when the register type indicates the data register whose initial value is the second value.

5. The reconfigurable computing circuit of claim 1, wherein
each data register includes a computational input operable to obtain computation data from a source that is not connected to the series of registers,
each configuration register includes a maintenance mechanism operable to restrict the configuration register from receiving information and maintain information currently stored in the configuration register, and
when each data register obtains the computation data, the control unit activates the maintenance mechanism of each configuration register.

6. The reconfigurable computing circuit of claim 1, wherein the configuration registers, the data registers, and the computing units are connected in a plurality of sets, each set having one of the configuration registers, one of the data registers, and one of the computing units.

7. A reconfigurable computing circuit comprising configuration registers, data registers, and reconfigurable computing units, the configuration registers and the data registers being connected in series, the computing units being connected respectively to the configuration registers, wherein each time a shift instruction is given, information in each of the configuration registers and each of the data registers shifts to next connected register in the series, and input information is stored into a starting register of the series, and a ratio of (i) a number of registers of a same type having been connected continuously in the series to (ii) a total number of registers is a predetermined value or higher.

8. The reconfigurable computing circuit of claim 7, wherein
the predetermined value is approximately 10% of a total number of registers.

9. The reconfigurable computing circuit of claim 7, wherein the configuration registers, the data registers, and the computing units are connected in a plurality of sets, each set having one of the configuration registers, one of the data registers, and one of the computing units.

10. A reconfigurable computing circuit mounting board comprising a first reconfigurable computing circuit and a second reconfigurable computing circuit, wherein each of the first reconfigurable computing circuit and the second reconfigurable computing circuit includes:
a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each of the configuration registers and each of the data registers shifts to next connected register in the series, with input information being stored into a starting register of the series;
a first storage unit storing one or more pieces of configuration information arranged in a predetermined order so as to be stored into the configuration registers;
a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group;
a generating unit operable to generate an initial value; and
a control unit operable to read, one by one, the plurality of pieces of group information from the second storage unit, judge a register type from a read piece of group information, and when the judged register type is data register, output the initial value, in synchronization with the shift instruction, to the reconfigurable computing block as many times as the number of registers indicated by the read piece of group information, and when the judged register type is configuration register, read as many pieces of configuration information from the first storage unit one by one as the number of registers indicated by the read piece of group information, and output the pieces of configuration information read from the first storage unit to the reconfigurable computing block one by one in synchronization with the shift instruction, and
an output of a last register in the series within the first reconfigurable computing circuit has been connected to an input of a starting register in the series within the second reconfigurable computing circuit.

11. The reconfigurable computing circuit mounting board of claim 10, wherein the configuration registers, the data registers, and the computing units are connected in a plurality of sets, each set having one of the configuration registers, one of the data registers, and one of the computing units.

12. An information processing device comprising a reconfigurable computing circuit, wherein the reconfigurable computing circuit includes:
a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each of the configuration registers and each of the data registers shifts to next connected register in the series, with input information being stored into a starting register of the series;
a first storage unit storing one or more pieces of configuration information arranged in a predetermined order so as to be stored into the configuration registers;

a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group;

a generating unit operable to generate an initial value; and a control unit operable to read, one by one, the plurality of pieces of group information from the second storage unit, judge a register type from a read piece of group information, and when the judged register type is data register, output the initial value, in synchronization with the shift instruction, to the reconfigurable computing block as many times as the number of registers indicated by the read piece of group information, and when the judged register type is configuration register, read as many pieces of configuration information from the first storage unit one by one as the number of registers indicated by the read piece of group information, and output the pieces of configuration information read from the first storage unit to the reconfigurable computing block one by one in synchronization with the shift instruction.

13. The information processing device of claim 12, wherein the configuration registers, the data registers, and the computing units are connected in a plurality of sets, each set having one of the configuration registers, one of the data registers, and one of the computing units.

14. A reconfigurable computing method for use in a reconfigurable computing circuit, wherein the reconfigurable computing circuit includes:

a reconfigurable computing block including configuration registers, data registers, and reconfigurable computing units that are respectively connected to the configuration registers, wherein the configuration registers and the data registers are connected in series, and each time a shift instruction is given at a predetermined cycle, information in each of the configuration registers and each of the data registers shifts to next connected register in the series, with input information being stored into a starting register of the series;

a first storage unit storing one or more pieces of configuration information arranged in a predetermined order so as to be stored into the configuration registers; and a second storage unit storing a plurality of pieces of group information that correspond one-to-one to a plurality of register groups which are sets of continuous registers of a same type obtained by grouping the series in a connection order from a starting register to an ending register of the series, each register group including one or more registers, each piece of group information indicating (i) a type of one or more registers included in a corresponding register group and (ii) a number of the one or more registers in the corresponding register group, and the reconfigurable computing method comprising:

generating an initial value; and reading, one by one, the plurality of pieces of group information from the second storage unit, judging a register type from a read piece of group information, and when the judged register type is data register, outputting the initial value, in synchronization with the shift instruction, to the reconfigurable computing block as many times as the number of registers indicated by the read piece of group information, and when the judged register type is configuration register, reading as many pieces of configuration information from the first storage unit one by one as the number of registers indicated by the read piece of group information, and outputting the pieces of configuration information read from the first storage unit to the reconfigurable computing block one by one in synchronization with the shift instruction.

15. The reconfigurable computing method of claim 14, wherein the configuration registers, the data registers, and the computing units are connected in a plurality of sets, each set having one of the configuration registers, one of the data registers, and one of the computing units.

* * * * *